US007920891B2

(12) United States Patent
Kwak

(10) Patent No.: US 7,920,891 B2
(45) Date of Patent: Apr. 5, 2011

(54) STAND ALONE EMERGENCY SIGNAL DEVICE HOUSED IN CELL PHONE

(76) Inventor: John J. Kwak, Flushing, NY (US)

( * ) Notice: Subject to any disclaimer, the term of this patent is extended or adjusted under 35 U.S.C. 154(b) by 760 days.

(21) Appl. No.: 11/859,133

(22) Filed: Sep. 21, 2007

(65) Prior Publication Data

US 2009/0082065 A1 Mar. 26, 2009

(51) Int. Cl.
H04M 1/00 (2006.01)
(52) U.S. Cl. ............... 455/550.1; 455/556.1; 455/404.1; 307/66; 340/436
(58) Field of Classification Search ............... 455/404.1, 455/404.2, 556.1, 550.1; 342/357.01; 340/436; 307/66
See application file for complete search history.

(56) References Cited

U.S. PATENT DOCUMENTS

| 5,797,091 | A | * | 8/1998 | Clise et al. | ............. 455/404.2 |
| 6,198,914 | B1 | | 3/2001 | Saegusa | |
| 6,636,732 | B1 | | 10/2003 | Boling et al. | |
| 2004/0005914 | A1 | * | 1/2004 | Dear | ............. 455/563 |
| 2009/0002145 | A1 | * | 1/2009 | Berry et al. | ............. 340/436 |

FOREIGN PATENT DOCUMENTS

KR 10-2005-0049455 Y 5/2005
KR 10-2005-0102605 A 10/2005

* cited by examiner

Primary Examiner — Danh C Le
(74) Attorney, Agent, or Firm — Lucas & Mercanti, LLP

(57) ABSTRACT

The emergency signal device includes an emergency key on the phone, an independent IC chip set controlling the emergency functions, a dedicated memory chip for emergency information and a by-passing outlet to the cell phone's transmitting parts. It is further provided that the device includes a global positioning system (GPS) receiver, so that the person in danger may always be located. This device utilizes rechargeable solar cells to provide energy. All of its components are powered by a solar cell or solar cell charged battery.

17 Claims, 11 Drawing Sheets

STAND ALONE EMERGENCY SIGNAL DEVICE HOUSED IN CELL PHONE

FIELD OF THE TECHNOLOGY

The present invention relates to a wireless communication system for transmitting emergency signals and more particularly, to an independent communication device housed in a cellular phone with an emergency signal capacity.

BACKGROUND OF THE ART

Wireless communication systems, such as radio frequency utilized systems, are advantageous for an emergency communication in that no physical interconnection is required between the transmitter and the receiver; once the information signal is modulated to form a modulated signal, the modulated signal may be transmitted over large distances.

A cellular communication system is one type of wireless communication system. A cell phone operative in such a cellular communication system contains circuitry permitting simultaneous generation and reception of modulated signals. Two-way communication between a radiotelephone and remotely-located transceivers is thereby permitted. A cellular communication system is formed by positioning numerous base stations at spaced-apart locations throughout a geographical area. Each base station contains circuitry transmitting modulated signals to a radio transceiver, thereby permitting communication between two cell phones.

One of the problems associated with cell phones is cell phone batteries can run out completely at the moments of an emergency when one needs call for help from the police or fire departments, or emergency services, and there is no other communicating way available. There is a need for a stand alone emergency signal unit operative in a standard cell phone which is applicable of sending out information for emergency rescue in following situations:

1. An emergency while the cell phone runs out of its regular battery completely; or the regular battery is too depleted to be functional;
2. An emergency in which caller is not capable of communicating vocally; and/or
3. An emergency in an unfamiliar area where a caller does not know his or her location.

SUMMARY OF THE INVENTION

This invention solves the problem in the prior art by employing a stand alone emergency signal device that is housed in a cell phone and can communicate with emergency services. Because the emergency signal device is a stand alone device, it operates independent of the cell phone and does not relay on the power supply of the cell phone.

This invention is directed to a cell phone having conventional modules including a transceiver which further including an independent emergency signal device that comprises: an emergency key, an independent control circuit containing a processor, coupled with said emergency key and optionally with said transceiver, a dedicated memory coupled with said processor, a GPS receiver or an interface for a GPS receiver on said control circuit, and one or multiple solar cell, optionally coupled with a rechargeable battery, electrically connected with said control circuit.

An independent emergency signal device is also provided includes an emergency key, a control circuit containing a processor, coupled with said emergency key, a memory chip coupled with said processor, a GPS receiver coupled with said control circuit, a transmitting unit coupled with said control circuit, an antenna for said transmitting unit and one or multiple solar cell coupled with a rechargeable battery, electrically connected with said control circuit.

The invention is further directed to a method of providing emergency service by using the emergency signal cell phone with the steps including providing said emergency signal cell phone to a user; providing a cellular communication system for said emergency signal cell phone; providing an emergency center monitoring emergency signals transmitted from the emergency signal cell phone; processing said emergency signals to acquire emergency information; and deploying service personnel for emergency rescue. A related method providing emergency service by using the independent emergency signal device is also provided.

Further embodiments of the device include a GPS receiver coupled with said interface; suitable interfaces coupled with cell phone modules including key pad, microphone and/or camera and/or an independent transmitting part coupled with the control circuit and a corresponding antenna.

Specific configurations of the device may include the solar cell being placed on a surface portion of said cell phone; a rechargeable battery being coupled with the solar cell; the emergency key being placed at a upper portion of a key pad of said cell phone; the memory being sectionalized; and the memory and GPS receiver being removable parts.

Specific transmitting means are also provided, such as, the transmitting unit and corresponding antenna being adapted to transmit to a satellite communication system or a short wave radio communication system.

To save energy and facilitate automatic emergency signal, the invention provides dedicated timers powered by the solar cell to limit the operating time for the control circuit and the processor.

BRIEF DESCRIPTION OF THE DRAWINGS

These and other aspect of the present invention maybe morefully understood by reference to one or more of the following drawings.

DETAILED DESCRIPTION OF THE INVENTION

Figure 1:
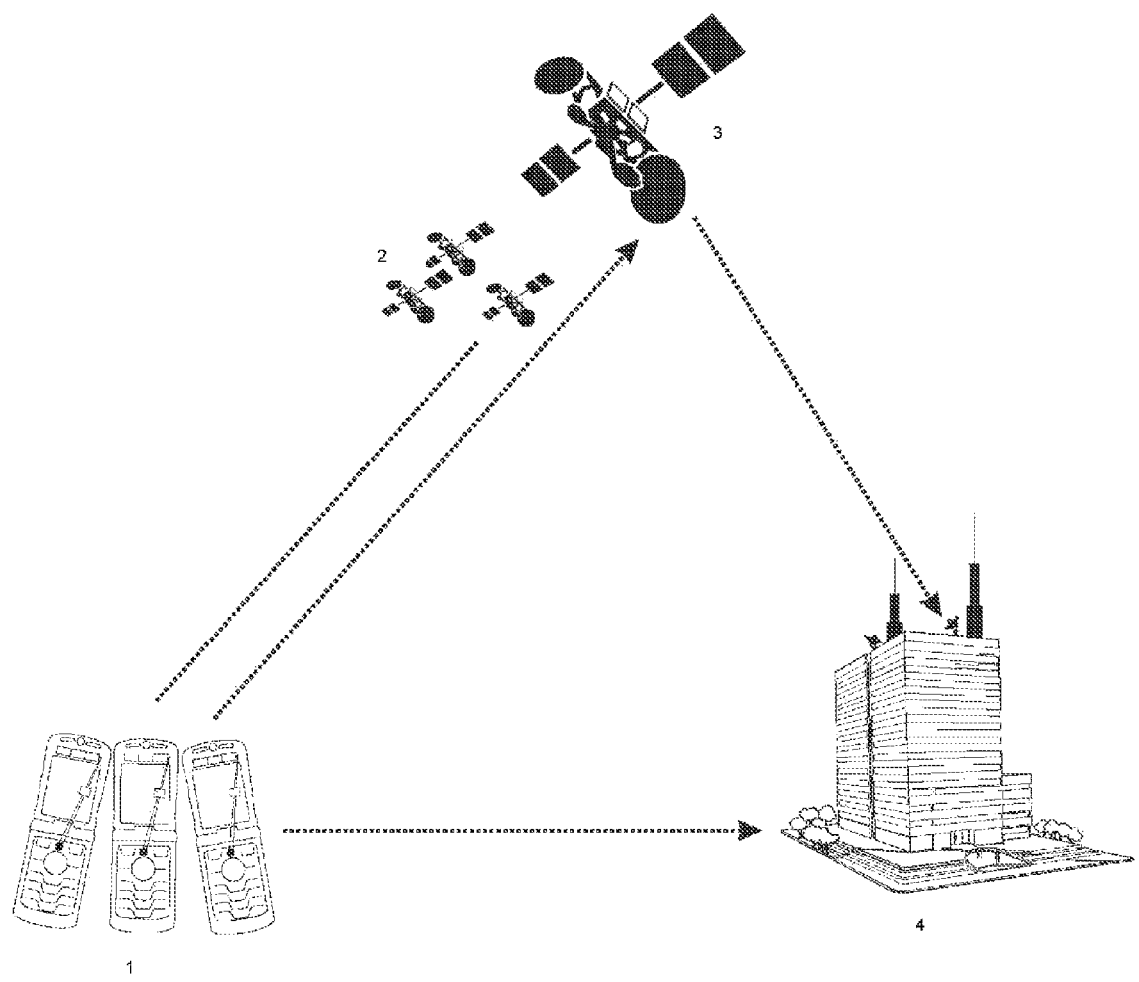
FIG. 1 is an illustration of the whole emergency system.

The present invention provides a stand alone emergency signal unit housed in a typical cell phone. This standby unit in a cell phone is designed to be compatible with available cell phone functional units and interfaces to use modules of the cell phone such as the transceiver parts, key pad, audio and/or camera. The invention is further defined as an independent emergency signal device which contains its own transmitting and receiving parts for communication. This invention is designed to be a one-way transmitting system for emergency signal only.

It further provides a service method for monitoring, reporting and rescuing the people in emergencies. When an emergency happens, the user can activate this stand alone signal system by holding the emergency button. The system will connect with a service channel by sending out emergency information stored in the dedicated memory, which enables the service provider to provide emergent help to the user. The emergency signal is initiated by the user, or by others who are helping the user in an emergency.

The functional parts of the device include an emergency button, a control unit, a rewritable memory chip storing emergency information, a receiver for GPS information and transmitter for out-going emergency signals, and a solar cell to power above mentioned parts. Optionally, a GPS receiving part can be an external part connecting to the control circuitry by a suitable interface thereon. A satellite antenna is included in the device for the sending signals to satellites.

In case of the emergency, a user may hold the emergency button, which will enable a solar cell power supply or a standby battery powered by the solar cell to activate the control circuitry unit to send the emergency signal.

The emergency button is a single stroke button to activate the function of emergency signal. To prevent any accidental hit during normal call, a timer is coupled with the emergency button. The holding time of the button has to be more than a preset time limit to activate the emergency system. A suitable preset time limit is from 2-10 seconds and more preferably 5 seconds.

The control circuit chip comprises a processor unit to control the initiation of the emergency signal and process the emergency signals for the transmission. The memory chip is coupled with the control circuit. The memory chip may have a pre-written subscriber ID information for the verification of the service subscription. These parts will be further detailed in the following disclosure.

The transceiver part is designed to receive and transmit signals via electromagnetic frequencies. A frequency band of the electromagnetic frequency spectrum (in the United States extending between 800 megahertz and 900 megahertz) is allocated for a cellular communication system. The allocated frequency band is further divided into a plurality of transmission channels of defined bandwidths. The transceiver part generates modulated signals and transmits the signal via one of the selected transmission channels. Transceiver parts designed for satellite communication or short-wave communication are also available.

A solar cell is used for an emergency power back up system. The invention utilizes solar panel on the surface of a cell phone to provide power for the emergency function. There may further be a dedicated rechargeable battery being continually charged by both the solar cell and the cell phone battery.

The solar cell feature of this invention is critical. Typically, a cell phone must be provides with a portable rechargeable battery for the operation of such phone. The finite energy storage capacity limits the operational period of the cell phone. For the use of cell phone in the event of emergency, it is critical that it has a standby power system and fundamental functions to report the personal identity, emergency conditions and/or location. In essence, to be used in such situations, a cell phone has to be designed as an emergency signal device.

Different from a typical cell phone system, the present invention provides a one-way transmission with a satellite or a conventional cellular network and the user would not be able to conduct a simultaneous two-way communication as with a conventional cell phone. This arrangement ensures that only emergency information is effectively transmitted by the limited power of a solar cell. Optimally, one-way reception part is provided for a GPS signal receiver. Accordingly, the present invention utilizes two one-way radio transmission means. One is a satellite receiving part designed for the incoming GPS positioning signals; another one is an out-going transmission part for sending emergency information to a remote location. Therefore a specially functioned radio transceiver is designed to be operative in a cellular phone unit coupling with the typical functional parts.

The desired emergency signal transmission can use any suitable electro-magnetic wave frequencies, such as short radio wave, microwave communication for satellites, or it can use the frequencies for commercial cellular phone station system. When cellular network is used for the emergency signal, the function would be actually operated only sporadically and rarely, therefore this is no significant burden to an available cellular station system.

Referring first to the schematic representation of FIG. 1, an emergency service system using the emergency signal devices can be set up as follows:

1) providing emergency signal for cell phones 1 to users;
2) acquiring GPS information from GPS satellite system 2;
3) operating emergency centers 4, which receives emergency signals from the cell phone 1 or from communication satellite 3; and
4) monitoring and processing emergency signals transmitted from the emergency signal cell phone.

Figure 2:
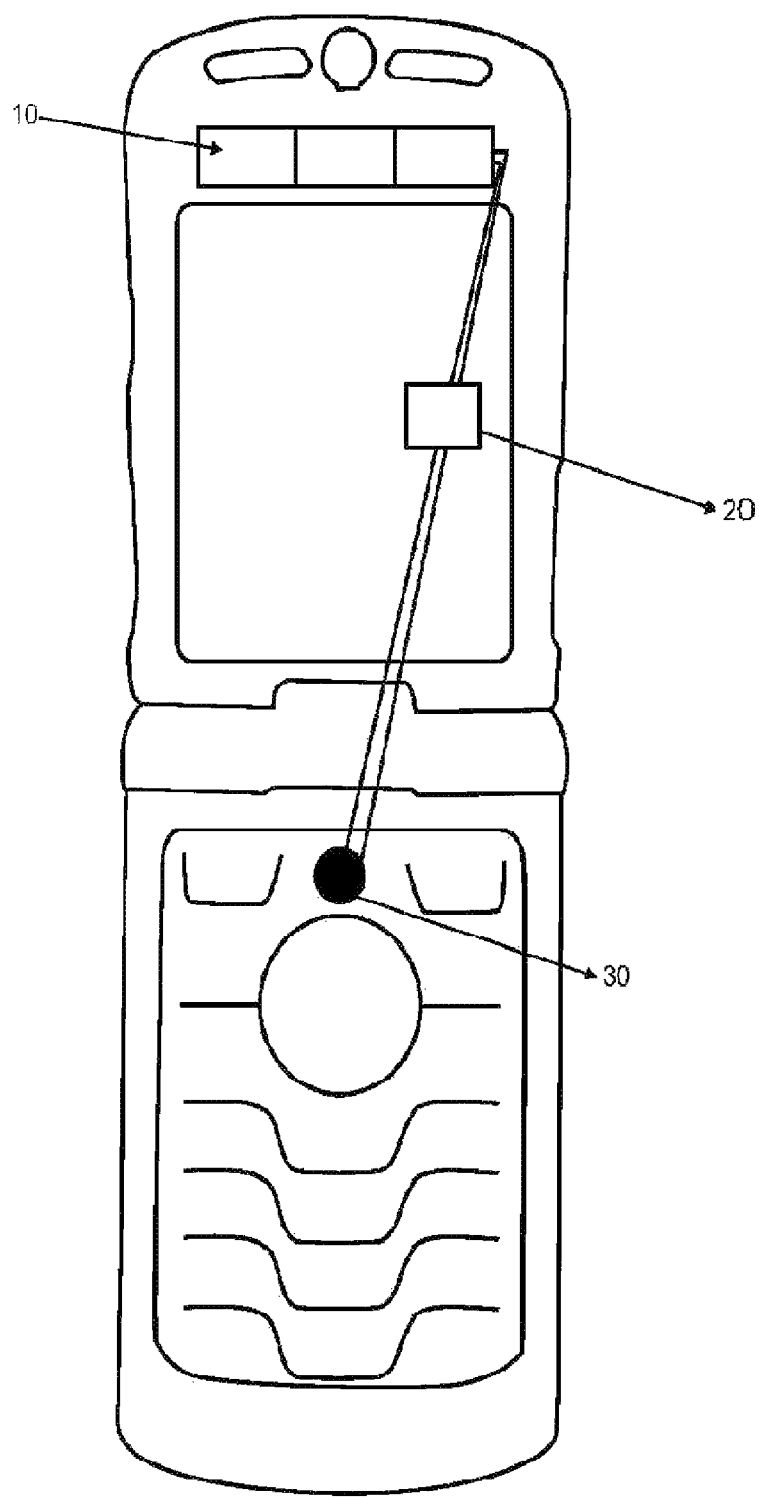
FIG. 2 is an illustration of the standby emergency device base on a cell phone.

FIG. 2 shows a design of an emergency signal cell phone of the present invention. In addition to the standard parts of a cell phone included in a conventional cell phone, a stand alone emergency signal devise housed in a cell phone further includes, at least, solar cell 10 mounted on the surface of the cell phone, control circuitry 20 in the cell phone and emergency button 30 at the key pad portion. The control circuitry incorporates a rewritable memory card for emergency information. The control circuitry is coupled with a GPS receiving part, mounted on said control circuitry or as a removable accessory to the cell phone. The device can be further provided a compatible interface with the cell phone for using key pad of the cell phone to input text information, or for acquiring audio or video/image via the microphone and camera of the cell phone.

Figure 3:
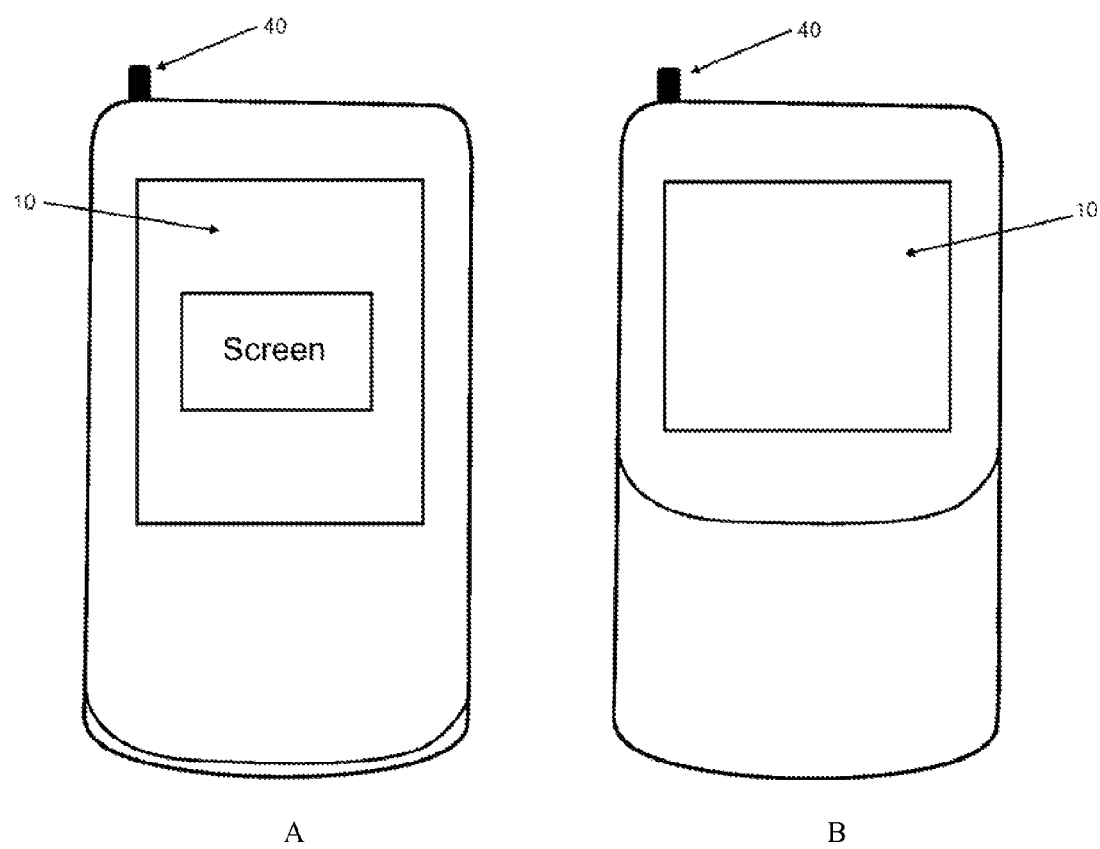
FIG. 3 shows external parts including solar cells and satellite antenna.

Referring to FIG. 3, the emergency signal device of this invention is a specially designed cell phone, which includes a housing enclosing the conventional circuitry coupled with the control circuitry of this invention, antenna 40 protruding beyond a top of the housing electrically coupled to the conventional circuitry and the control circuitry housed within. The face A and/or the back B surface of the housing are provided with solar cells 10 to generate energy for the standby emergency signal function. While not shown, a regular battery set is available to power the conventional circuitry during the typical operation of phone. A dedicated battery set housed within can also be provided, which is appropriately coupled to the solar cell to store the solar energy and coupled with the control circuitry for its function.

While not shown in the figures, an interface for typical cell phone functions are provided inside the cell phone. The key pad of the cell phone, the microphone and, depends on the type of the cell phone, a camera thereof are appropriately coupled to the designed circuit chip by the interface.

To use the device, a user pushes the emergency button on the operation face of the cell phone for a time longer than a predetermined period, which will enable the power supply from the solar cell. The actuation of the power causes the circuit chip operated to acquire the location information from the GPS receiving unit, retrieve emergency information from the memory and transmit information to a satellite or a base station of a cellular communication system. After the completion of the transmission, the signal system will resume a standby status. To minimize the size of the circuit chip and to maximize the power life of the solar cell, above communication is only one-way enabled.

If the cell phone battery has not been depleted, more information can be provided for transmission. Information about the emergency situation, such as text message typed in via key pad of the cell phone, pictures of the condition acquired by the imbedded camera, or voice messages recorded via microphone can be input into the dedicated memory. The information stored and ready for transmitted is encrypted and compressed. Therefore the information signals will be of composed signals and the transmission will be in a short period of time to ensure privacy and to save energy.

After receiving the emergency signals from the person in trouble, a dedicated server will decompress decipher the signal and calculate the location of the sender. The service personal will figure out the nature of the emergency and deploy the rescue force.

There can be three type of transmission, which includes satellite transmission, local cellular station transmission and/or short-wave radio transmission. In each of these transmission configurations, the designed transceiver circuit chip is coupled to the respective antenna and oscillator parts and the power supply from the solar cell or the rechargeable battery.

For satellite transmission, the communication circuit will be configured with typical microwave transmitter and antenna to transmit the emergency information by preset band of microwave. In case of short-wave transmission, the communication circuit will be coupled with typical short-wave transmitter and antenna. For the option of utilizing the available cellular station system, the emergency signal communication has to access an emergency service number, such as a 911 number, or private service company's number.

Figure 4:
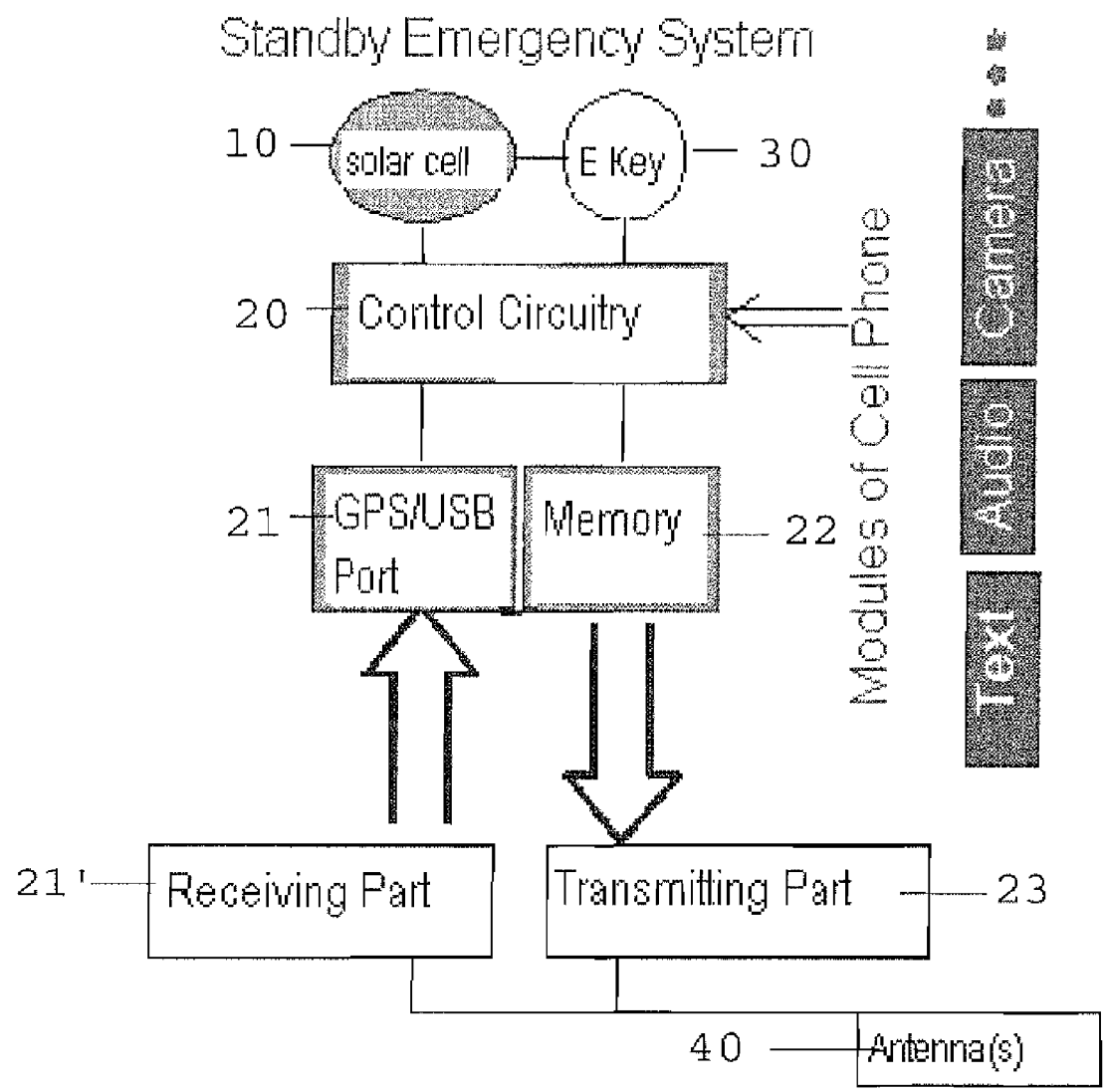
FIG. 4 is a block representation of this invention.

FIG. 4 shows the configuration of the device of this invention. It includes a solar cell 10, optionally coupled with a rechargeable battery, an emergency key 30, an independent control circuit containing processor 20, coupled with a dedicated memory 21 and a GPS receiver 21' or an interface for such a receiver 21. It may further comprise a transmitting part 23 for emergency information transmission and a corresponding antenna(s) 40. It is also provided interfaces with modules of cell phone, such as the text key pad, audio device, and/or camera.

Figure 5:
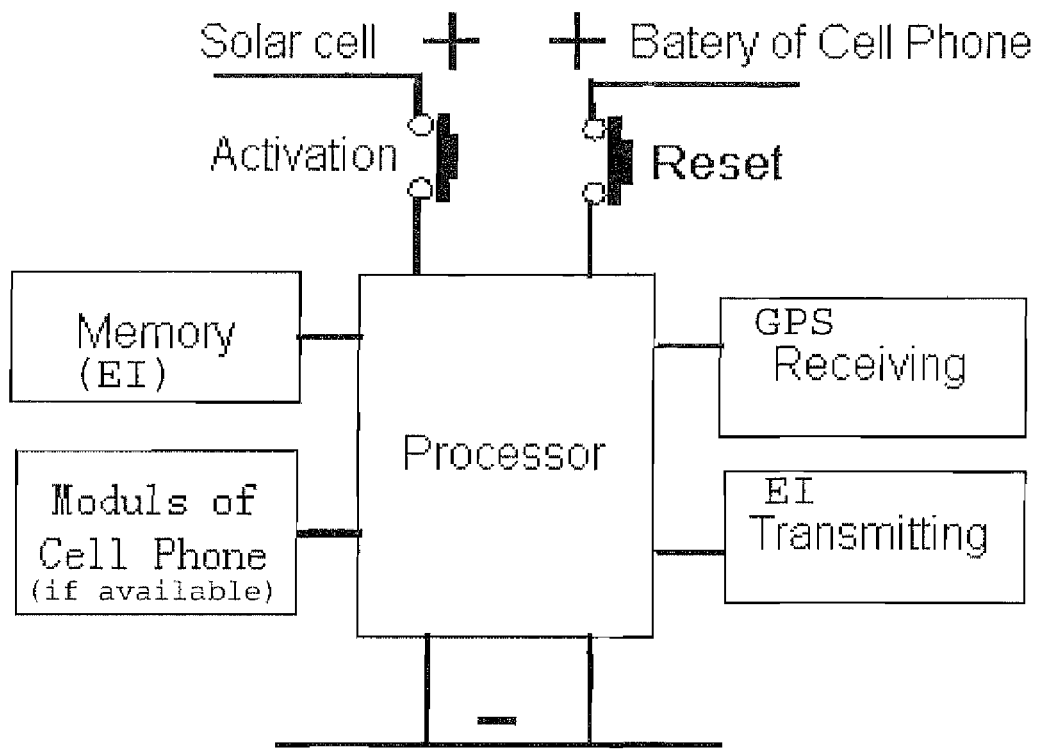
FIG. 5 is a diagram of functional units of this invention.

FIG. 5 is a function diagram of this invention. Holding the emergency button activate the switch connecting a solar cell. This initiates the operation of the control circuitry including a properly programmed processor. The control circuitry will perform the following operations:

1. timing the holding time of the emergency button;
2. acquiring and writing the GPS positioning data into the memory;
3. acquiring data from input modules of cell phone and writing the information into the memory;
4. reading the emergency information from the memory for transmission;
5. transforming signals from digital to analog ones and vise versa; and/or
6. timing the duration of the emergency transmission.

For the operations 2 and 3, if the regular battery of cell phone is available, the power will be first supplied from the regular battery. These functions can be realized by proper programming of the processor.

After the processor had been actuated, the receiving portion is enabled for (GPS navigation signals and the transmitting portion is set to be ready for transmission.

Figure 6:
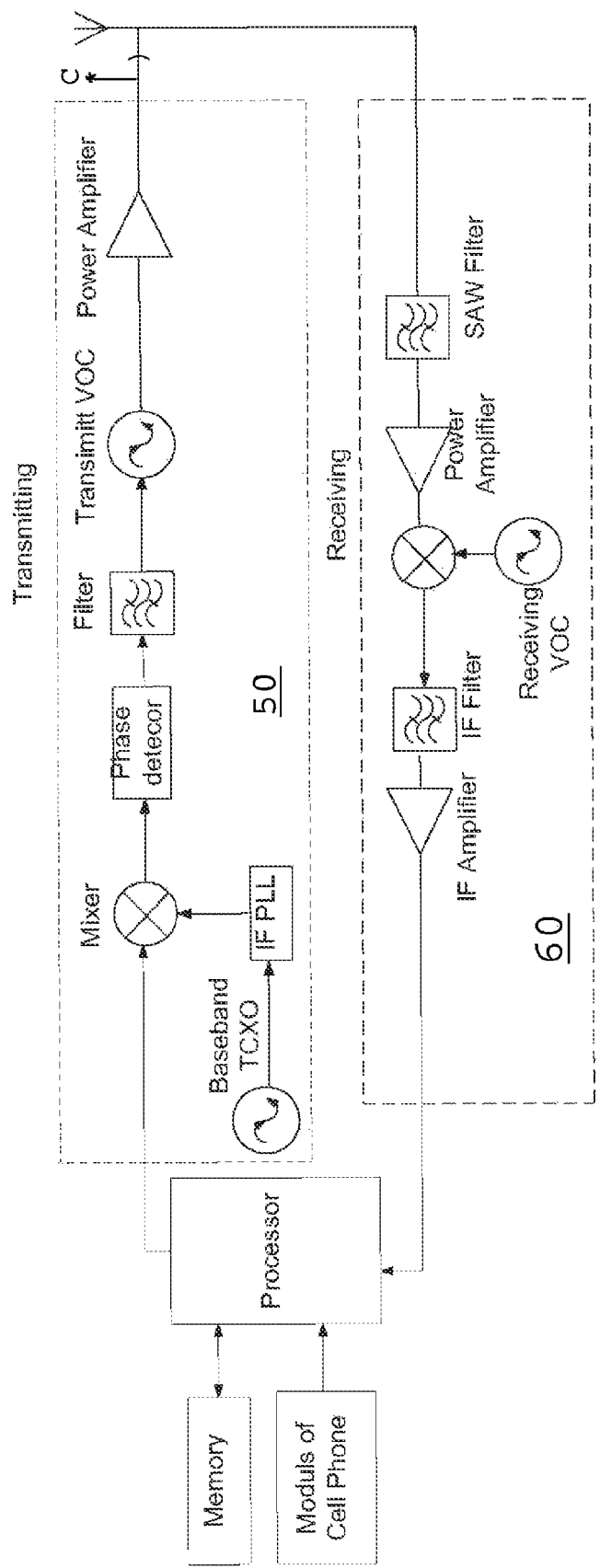
FIG. 6 is a flow chart showing the functional steps of this invention.

Block diagram of FIG. 6 shows a circuitry design of the transmitting portion 50 and receiving portion 60. Note that it is the logical sequences performed by such circuit and it may be embodied in deferent types of circuit product.

The receiving portion is a GPS receivers to capture the GPS location signals from the constellation of 27 earth-orbiting satellites. The frequencies of the signals are available from (1) L1 (1575.42 MHz): Mix of Navigation Message, coarse-acquisition (C/A) code and encrypted precision P(Y) code.

(2) L2 (1227.60 MHz): P(Y) code, plus the new L2C code on the Block IIR-M and newer satellites.

(3) L3 (1381.05 MHz): The Nuclear Detonation (NUDET) Detection System Payload (NDS) satellites.

(4) L4 (1379.913 MHz): With additional ionospheric correction. Or (5) L5 (1176.45 Mhz): Proposed for use as a civilian safety-of-life (SoL) GPS modernization system. This frequency falls into an internationally protected range for aeronautical navigation, promising little or no interterence under all circumstances.

The location of the emergency spot such as longitude and latitude can be computed from the signals of any four satellites. To minimize the burden of the processor of the present device, the processor only to acquire and process the positioning data for recording into the memory and transferring to the transmitting part. The calculation of the positioning information will be performed by the service center. For the raw positioning data, any frequency band in above list can be adopted. The corresponding integrated circuits of receiving portion and antenna are selected to working on the frequency band.

The receiving portion works as follows. After receiving the GPS navigation signals from the antenna, low noise SAW (surface acoustic wave) filter is applied and the filtered signal is demodulated to intermediate frequency band by the receiving VCO. The navigation signal is further enhanced by intermediate frequency filter and amplifier and finally is supplied to the processor for treatment.

If the GPS satellite selected also provides communication channels, the working frequency of the transmitting portion can adapt to the frequency range of the receiving portion. In this case, same satellite antenna S can be used for both portions.

The working frequency of transmitting portion can also be extended to various GSM bands available for cellular communication system. Current cell phone communication frequencies are listed in Table 1.

TABLE 1

Transmit and receive bands for the various GSM bands

| Band/System | BTS transmit (mobile receive) | BTS receive (mobile transmit) |
| --- | --- | --- |
| 900 MHz | 935-960 MHz | 890-915 MHz |
| DCS 1800 | 1805-1880 MHz | 1710-1785 MHz |
| PCS 1900 | 1930-1990 MHz | 1850-1910 MHz |

For the transmission using cellular network, the communication with the emergency service provider is initiated by pre-loaded emergency access number. The signals to be transmitted have to be modulated to intermediate frequency hand and transmitted by a transmitting VOC, a power amplifier and antenna C for cellular communication.

The transmission can also be designed to use short-wave frequencies. Block 50 in FIG. 6 presents a general framework of transmitting circuits. Additional parts for specific transmission bands should be included when the specific band is selected.

A device utilizing satellite communication system for emergency information transmission is also feasible. The transmitting parts are available for several commercial satellite phone providers. Major satellite telephone systems are INMARSAT, Globalstar, Iridium and Thuraya. The INMARSAT satellite system uses the BGAN and RBGAN satellite networks. However, the phone must be stationary while in use and is not suitable for this invention. Globalstar, Iridium and Thuraya satellites are earth orbiting satellites, which facilitate greater mobility. Therefore, an emergency signal device can be easily adapted to utilize these satellite systems for transmitting emergency signals. The antenna parts for these satellite systems are commercially available, although the phone using satellite communication is much bulkier compare with a regular cell phone.

Figure 7:
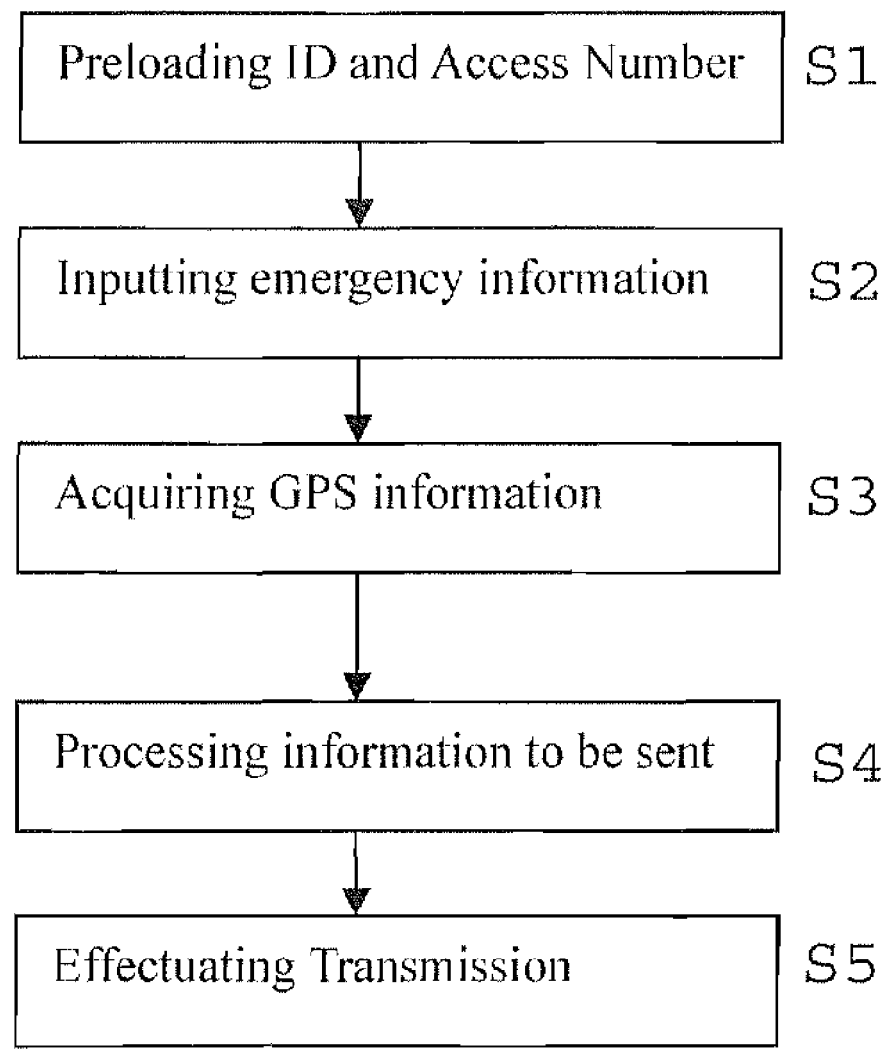
FIG. 7 is a block circuit diagram of this invention including optional steps in dashed boxes.

FIG. 7 is a logical flow diagram shows the process in which the device utilizes a cellular communication transmission. Process 1 (P1), an emergent number associated with the emergent service provider and important personal information are preloaded by service provider into the memory chip. Step 2 (S2), the emergency information, such as personal information, environment information in images or voices acquired cell phone modules, are input by the user. This information was transformed and loaded into the memory via the control unit. A special emergency key operation, such as double hit the key in 5 second, is designed for this pre-loading. Step 3 (S3), when the emergency happens, user holds the emergency button to effectuate the processor and the receiving and transmitting potions. This enables the GPS positioning data acquisition. Step 4 (S4), the emergent number in the memory is retrieved by the processor and the transmitting portion is activated. Then, the processor will process the emergency information to be transmitted. This includes prioritizing the sequence of the information and encrypting of the information. Finally, Step 5 (S5), the transmission begins. All the information, including position information, text, pictures and voices are transformed, filtered, amplified, modulated and transmitted to the emergency service provider.

In order to save the resource for further emergency signal, a predefined time limit for transmitting is set up. A preferred time limit can be present based on the solar cell and/or its rechargeable battery type. A typical time limit will be from ½-2 minutes. When the time is out or the transmission is finished, the system returns to the standby status and is ready for the next signal.

Figure 8A:
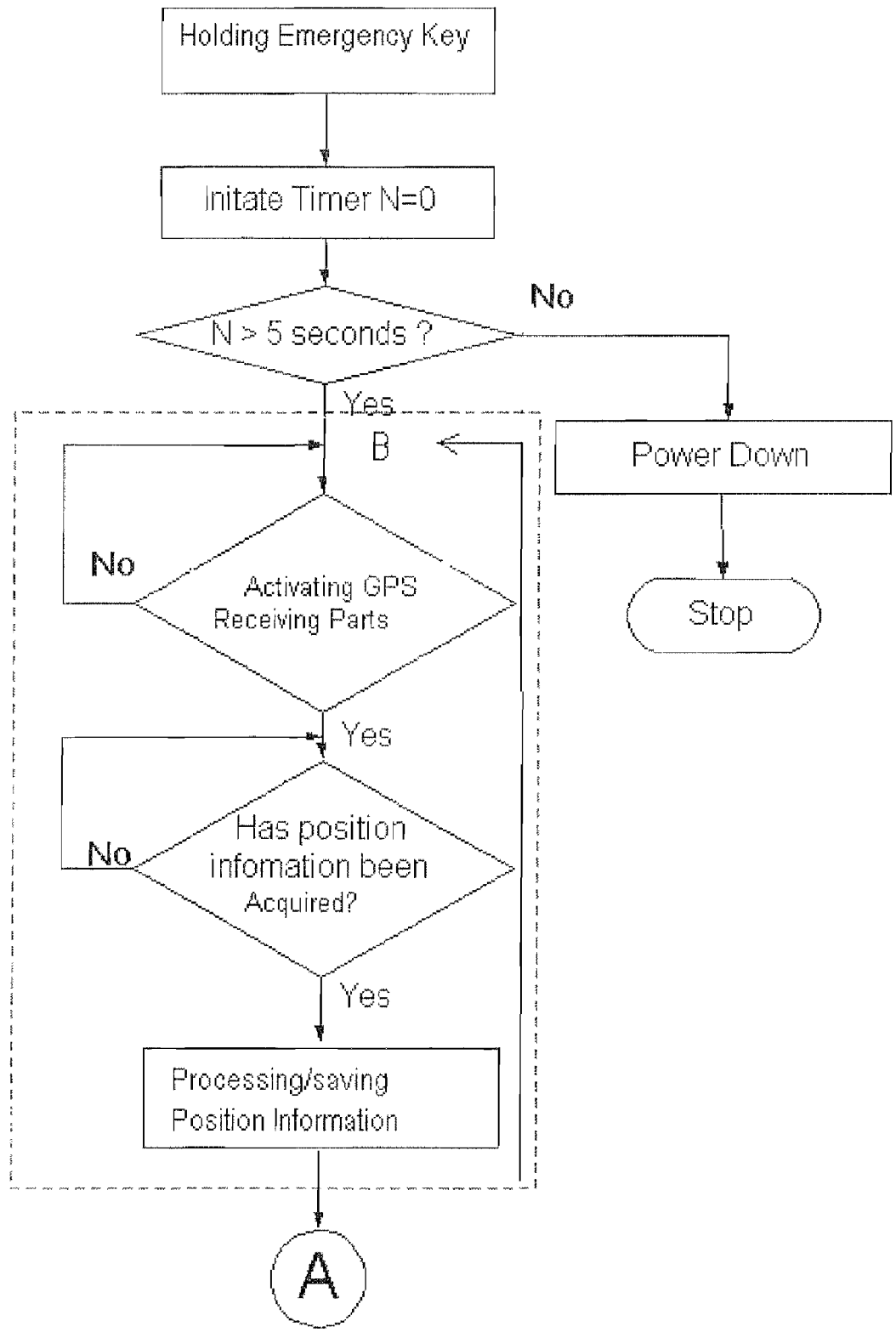
FIG. 8 is a flow diagram of the algorithm of this invention.
Figure 8:
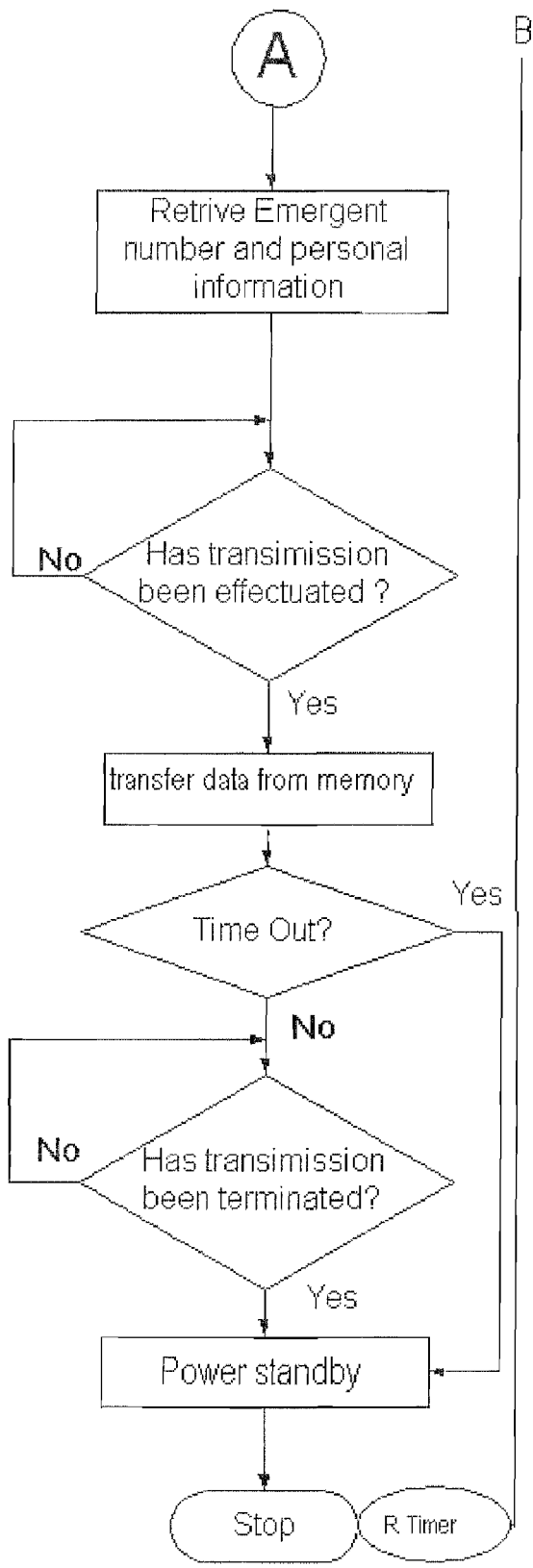

FIGS. 8A and 8B are flow diagrams of an algorithm for the control circuitry of this invention. First, the activation button is pressed so as to initiate the timer of the process. Then a determination is made by a decision block. If "No" branch is taken when holding time is lapsing less than a predefined time, here as 5 seconds, the power of this invention is shut down and the system returns to standby status. If the "Yes" branch is taken, GPS receiving portion is activated. The decision blocks determine whether the receiving is effectuated successfully and whether the positioning information is processed. After the GPS receiving portion has been executed, the processor will retrieve the emergent number from the flash memory and to effectuate the connection with the emergency service center. When transmitting being effectuated, the control unit will retrieve emergency information, including GPS data from the memory chip in certain order and transform them into suitable signals for transmitting. A LCD light can be provided indicating the emergency information is transmitting to the service center. A second timer can also be set for the transmitting time. A following decision block determinates whether the timer is time-out for a pre-defined transmitting time. If the "yes" branch is taken, the algorithm leads to terminate the transmission. If "no" branch is taken, the decision block enables that further the data transmitted.

A recurring signal function is provided by a standby timer, which will repeat the process from the position B in FIG. 8A. This will set up an automatic emergency signal according to a predetermined interval with a trail of location information updated in each signal. This automatic signal function can be terminated by a pre-set emergency button operation, such as a short holding of the button. Then the standby power is shut down and the algorithm terminates and is set back into the standby status.

One of the features of the present invention is that data for transmitting are supplied from a dedicated memory. There are several considerations for this arrangement. First of all, it serves to prioritize the information to be sent out. In the invention, the emergency information is organized in different sections of the memory chip and is retrieved in certain order; second, it serves to shorten the transmission time by compressing and processing readily available information directly from the instantly accessible memory chip; third, it serves an automatically repeating emergency signal with updated GPS location, therefore emergency information continually sending will include the key information without the need to re-input; fourthly, the stored GPS location data will provide a traceable path shows how the person in emergency was transported.

This invention is designed to be a stand alone system independently operative from the typical functions of a cell phone. It utilizes available modules of the cell phone for additional functionalities. This one-way signal system has the capacity and flexibility of sending emergency information including personalized health condition (such as previous disease, family doctor's name, which is very helpful for the very first aid for life saving), location of the emergency and/or current situation (via sounds or image of the environment). Commercially available electronic parts can be used to construct the emergency signal device in this invention. Some considerations are provided as follows for the selections of these parts.

(a) Control Circuitry and the Processor

Control circuitry is designed to control the interfaces of input and output, including the GPS receiving part and available phone models for inputting, and transmitting part for outputting. It transforms analog data to digital data and vise versa.

The processor is a key component of the control circuitry. It can be a microprocessor such as 8051 or Field-Programmable Gate Arrays. If microprocessor is employed, assemble language or C language for the control functions can be used.

(b) Receiving and Transmitting Parts

The receiving and transmitting portions in FIG. 6 are designed for general communication system. Corresponding integrated circuit chips as RF processor, receiving VOC, transmitting VOC, power amplifier and power controller can be selected according to specific frequency, for example, microwave or short-wave.

The receiving and transmitting parts of this invention are independent with each other forming two one-way communication systems. The receiving part is essentially a satellite GPS receiver adapted to selected GPS channels. The transmitting parts can be adapted to cellular communication system, satellite communication system or a short-wave radio communication system.

(c) Memory

Memory in this invention should be rewritable. That is, memory is of a kind allowing alteration of the contents stored therein by an end-user. The memory does not need power to maintain the information stored in the chip. The memory chip can be incorporated into the control unit, coupled with the processor thereof to read and write the emergency information. In particular, the GPS positioning information need to be written to the memory chip, thereby the composed emergency signal will include a current position information of the person in emergency.

Such a memory can be a hybrid of ROM and RAM, such as a flash memory. The memory will be divided in several sections. The section for service ID and registration may be a Read Only section. The section for GPS positioning data enables sequential savings of multiple positioning data in the input order. It is set that the memory section for GPS data can only be erased when reset the emergency device. The section for emergency text, voice and/or images will be erasable section, in which, each writing erases previous data. A removable memory card can also be used. The size of the memory depends on the amount information required by user. Atmel, Inc. provides flash memories with sizes ranging from kilo to mega bytes.

Figure 9:
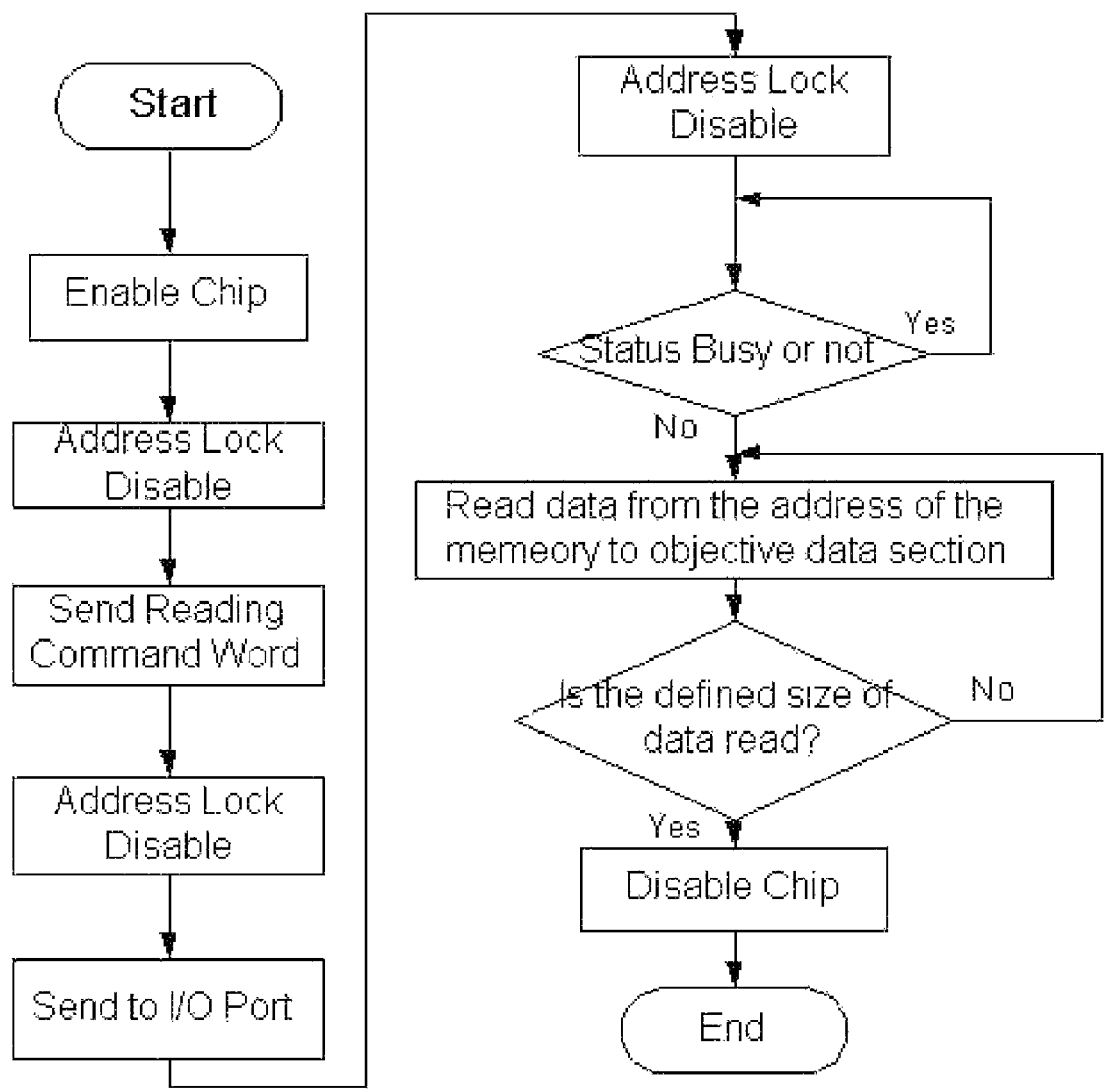
FIG. 9 is a flow diagram of reading a memory chip in this invention.
Figure 10:
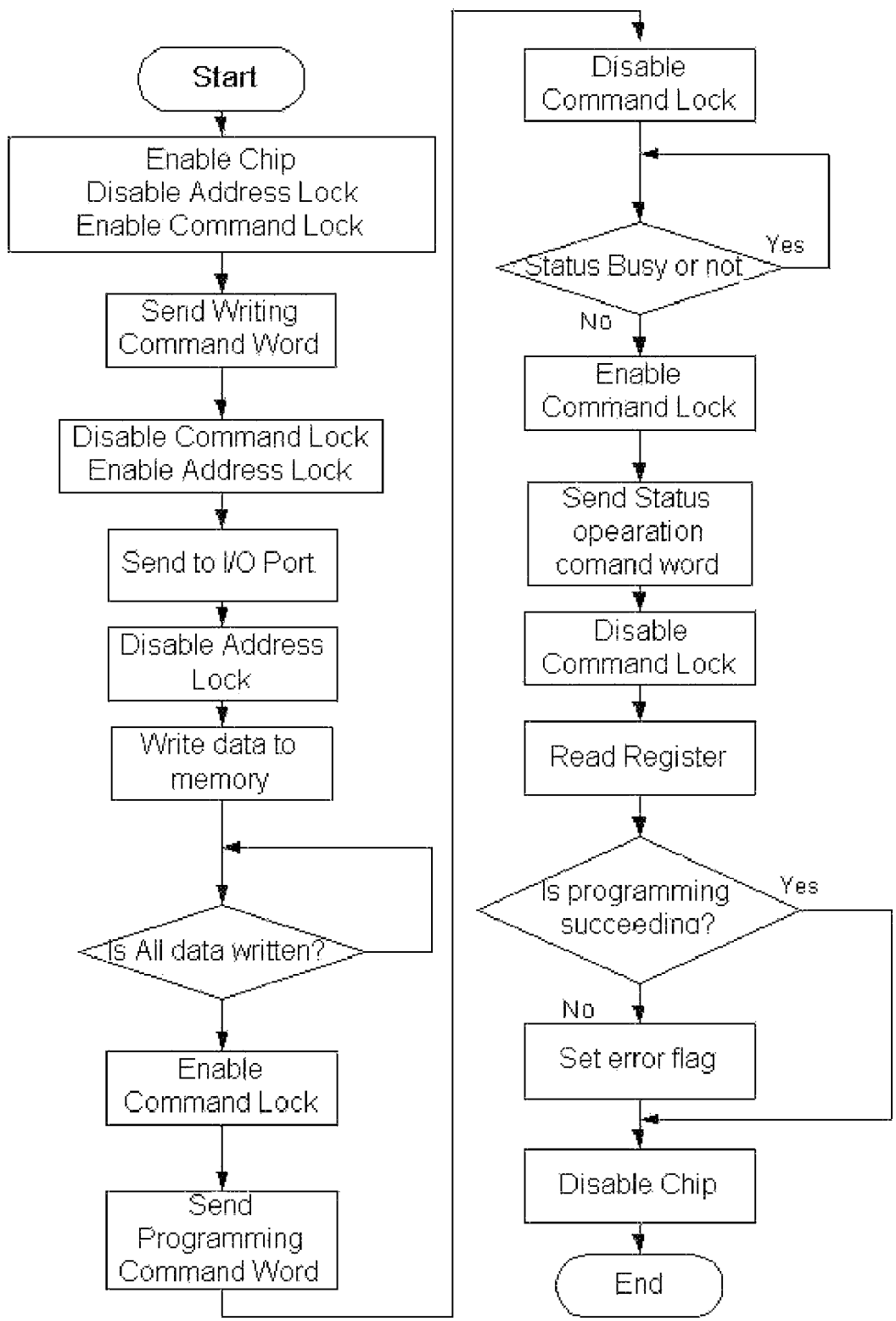
FIG. 10 is a flow diagram of writing the memory chip.

FIGS. 9 and 10 are flow diagrams of reading and writing a memory chip in this invention. Proper programming of the processor can be easily done according to these flow charts.

(d) GPS

GPS receiving parts are commercially available. A GPS receiving unit can be coupled in the control circuitry as the receiving part. It can also be a plug-in device which connects to the control circuitry via proper interface gate, such as a USB port. This invention only needs the raw positioning data. To save the processing resource of the processor, it leaves the tasks of calculation of the positioning information and the location of the spot on a suitable map to the service center.

The service center is equipped with suitable means to receive, decompress and decipher the emergency signals. To get the location of the emergency spot, a computer needs to know the precise time of the positioning data received, which is embedded by the processor in the control unit of this invention via its internal crystal oscillator-based clock. The orbital position data from the navigation signals acquired by the receiving unit is then used to calculate the satellite's precise position. When four satellites are measuring simultaneously, the intersection of the four imaginary spheres reveals the location of the receiver. The positioning information as longitude and latitude of the emergent spot can be calculated. A standard map database is then applied with these location data for the accurate position, such as street or road number, if available.

(e) Solar Cell

For a standard of GSM system, the power level ranges from 800 mW (29 dBm) to 20 watts (43 dbm). However, this invention is designed to minimize the power consumption to facilitate the use of solar cell as the main power. Suitable solar cell can be found, for example, from Clare, Inc.

While the present design has been described in connection with the embodiments disclosed above, it is to be understood that other similar implementations may be used and modifications and additions may be made to the described embodiments for performing the same function of the present design without deviating therefrom.

What I claim is:

1. An improved cell phone having conventional modules including a transceiver and a first rechargeable battery, the improvement comprising:
    an emergency signal device comprising:
        an emergency key;
        an independent control circuit containing a processor, coupled with said emergency key;
        a dedicated memory coupled with said processor;
        a GPS receiving part coupled with said control circuit;
        one or more solar cells, electrically connected with said control circuit; and coupled with
        a second rechargeable battery operatively coupled with said control circuit for use only in connection with the emergency signal device to ensure that the emergency signal device has battery power available for use even if the first rechargeable battery has no available battery power.

2. The cell phone of claim 1, wherein said control circuit is coupled with said transceiver.

3. The cell phone of claim 1, wherein said GPS receiving part is a removable external GPS receiver.

4. The cell phone of claim 1, further comprising:
    an independent transmitting part coupled with said control circuit and a corresponding antenna.

5. The cell phone of claim 1, wherein said emergency key is placed at an upper portion of a keypad of said cell phone.

6. The cell phone of claim 1, wherein said solar cell is placed on a surface portion of said cell phone.

7. The cell phone of claim 1, wherein said memory has different sections for different emergency information.

8. The cell phone of claim 1, wherein said memory is a flash memory.

9. The cell phone of claim 1, further comprising:
    one or more interfaces coupled with cell phone modules including key pad, microphone and/or camera.

10. A method of providing emergency service by using the cell phone including the first rechargeable battery as defined by claim 1 comprising the steps of:
    a) providing said emergency signal cell phone to a user;
    b) providing a second rechargeable battery operatively coupled with said control circuit of said emergency signal device for use only in connection with the emergency signal device to ensure that the emergency signal device has battery power available for use even if the first rechargeable battery has no available power;
    c) providing a cellular communication system for said emergency signal cell phone;
    d) providing an emergency center monitoring emergency signals transmitted from the emergency signal cell phone;
    e) generating an emergency signal generated by said emergency signal device;
    f) processing said emergency signal generated by said emergency signal device to acquire emergency information; and
    g) deploying service personnel for emergency rescue.

11. An emergency signal device for use with a mobile phone having a first rechargeable battery comprising:
    an emergency key;

a control circuit containing a processor, coupled with said emergency key;

a memory chip coupled with said processor;

a GPS receiving part coupled with said control circuit;

a transmitting unit coupled with said control circuit;

an antenna for said transmitting unit; and one or more solar cells coupled with a second rechargeable battery, electrically connected with said control circuit for use only with the emergency signal device to ensure that the emergency signal device has battery power available for use even if the first rechargeable battery has no available battery power.

12. The emergency signal device of claim 11, wherein said transmitting unit and corresponding antenna are adapted to transmit to a satellite communication system.

13. The emergency signal device of claim 11, wherein said transmitting unit and corresponding antenna are adapted to transmit to a short wave radio communication system.

14. The emergency signal device of claim 11, wherein said memory chip and said GPS receiving part are removable parts.

15. The emergency signal device of claim 11, wherein said control circuit further comprises an independent timer coupled with said emergency key and said solar cell.

16. The emergency signal device of claim 11, wherein said control circuit further comprises an independent timer coupled with said processor and said solar cell.

17. A method of providing emergency service by using the emergency signal device as in claim 11 comprising the steps of:

a) providing said emergency signal device to a user;

b) providing a second rechargeable battery operatively coupled with said control circuit of said emergency signal device for use only in connection with the emergency signal device to ensure that the emergency signal device has battery power available for use even if the first rechargeable battery has no available power;

c) utilizing a satellite or a radio communication system for said emergency signal device;

d) providing an emergency center monitoring emergency signals transmitted from the emergency signal device;

e) generating an emergency signal generated by said emergency signal device;

f) processing said emergency signal generated by said emergency signal device to acquire emergency information; and g) deploying service personnel for emergency rescue.

* * * * *